…

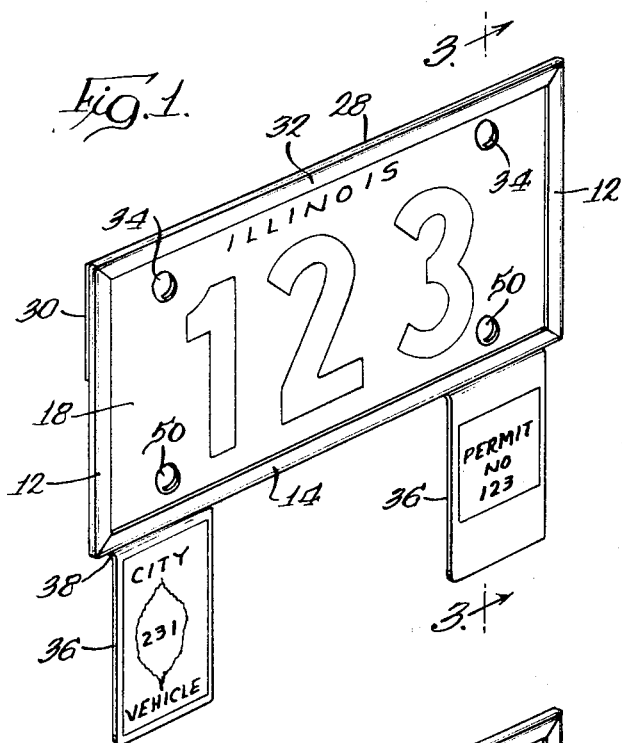
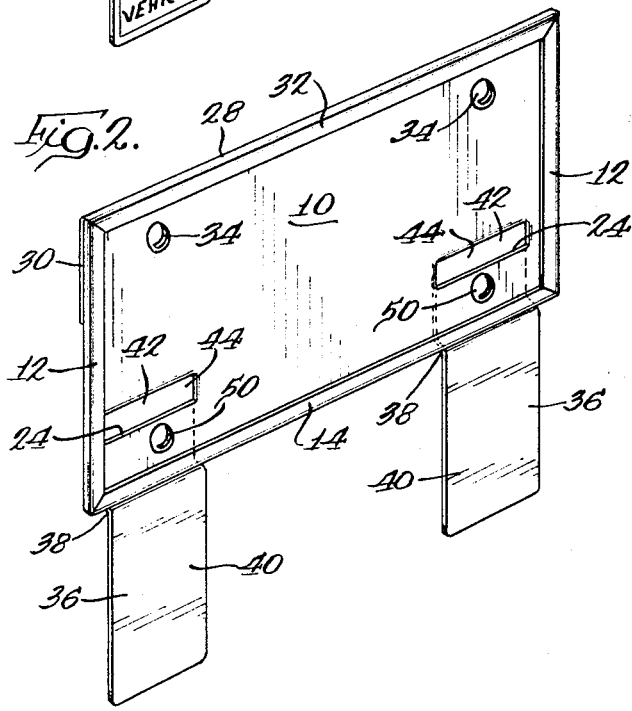
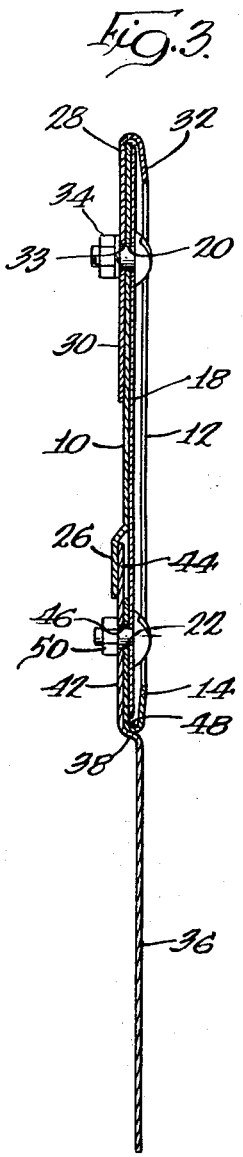

United States Patent Office 3,408,760
Patented Nov. 5, 1968

3,408,760
LICENSE PLATEHOLDER
Thomas E. Barr, 546 E. Lincoln Ave.,
Palatine, Ill. 60067
Filed Jan. 23, 1967, Ser. No. 611,124
2 Claims. (Cl. 40—210)

ABSTRACT OF THE DISCLOSURE

A frame type license plateholder with auxiliary mounting areas for local permits and the like.

BACKGROUND OF THE INVENTION

Field of the invention

License plateholder for automotive vehicles.

Description of the prior art

Modern motorcycles come equipped with brackets for mounting the necessary state license plates which amount to little more than bolt receptacles to which the license plate is supposed to be bolted. Conventional license plates for such motorcycles are, in most States, substantially standard in size and have a pair or four holes at standard spacing or slots for the reception of bolts for such mounting.

The license plates, as mounted, are thus unsupported at their edges, and being usually made of flimsy material, are easily bent. Likewise, they offer sharp edges which are capable of inflicting scratches or cuts on anyone concerning themselves closely with such a machine.

Furthermore, there is often a need for additional licenses, stickers or permits to be mounted on such a vehicle. Commonly, city vehicle tags are required, and, motorcycles of this type being exceedingly popular among college students, college registrations or operating permits may also be needed. The machines as furnished by the dealers, provide no good display space for such stickers or tags.

SUMMARY OF THE INVENTION

This invention has as a major object, therefore, the provision of a license plateholder easily mountable to a motorcycle furnished with conventional license plate mounting brackets which supports and encloses the license plate so as to avoid easy deformation thereof and which covers the raw edges of such a plate so as to shield users and others from cuts and scratches by the license plate edges and which is notable for its simplicity and inexpensiveness. Another principal object of this invention is to provide a holder of such a character which includes, additionally, firmly supported and rigid surfaces for the display of ancillary identifications such as permits, city tags, and the like. Other objects and advantages will be evident from the following description and drawings.

BRIEF DESCRIPTION OF THE DRAWINGS

FIG. 1 is a perspective view of a license plateholder incorporating the principles of this invention shown with a license plate and stickers attached;

FIG. 2 is a view similar to FIG. 1 showing the device without the presence of the license plate or stickers; and FIG. 3 is a section taken substantially along the line 3—3 of FIG. 1 looking in the direction of the arrows.

DETAILED DESCRIPTION

The illustrated holder consists first of a back plate 10 which is a generally rectangular sheet of metal proportioned to be slightly larger than the license plate which it is to mount and having miter-ended side 12 and bottom 14 edges recurved through approximately 180° back over on the plate 10 to be spaced somewhat outwardly from the face of the plate. The recurved edges 12 and 14 thus defined side and bottom channels to receive the side and bottom edges of the license plate 18. The back plate is bored at its corners well inwardly of the channel edges as at 20 and 22 for the reception of bolts or screws.

Immediately above the lower screw holes and centered thereon, longitudinal slits 24 are cut in the back plate, and the metal above the slit struck out to be offset rearwardly to define a closed end, downwardly facing louvre 26.

The holder likewise includes a closure plate 28 which consists of a back flap 30 spanning the back plate 18 and overlapping the upper edge thereof on the back side. On its upper edge it includes a recurved miter-cornered frame portion 32 which, when the top plate is assembled to the back plate, completes and closes the frame defined by the side and bottom recurved edges 12 and 14 to enclose totally the edges of the license plate 18. The radius of recurvature of the closure plate will be slightly greater than that of the back plate to compensate for its offset due to the overlap. The back flap 30 has holes 33 therethrough aligned with the holes 20 of the back plate when the frame portion 32 is snugly in place for the reception of bolts 34.

The holes 20 and 33 will be spaced to fit standard mounting brackets of motorcycles and similar vehicles and desirably will fit the preformed mounting holes in license plates so that the bolts 34 may extend through the license plate, the back plate, the back flap, and the mounting bracket of the vehicle to fix the license plate to the holder, the holder together, and the holder and plate to the vehicle.

The sticker tabs 36 are relatively long narrow plates with a transverse offset 38 therein. Although relatively narrow, their width should be sufficient to accommodate commonly encountered permits, stickers, city licenses, and the like. The offset defines a longer display portion 40 which extends free from the lower edge of the license plateholder and a shorter mounting portion 42 which lies against the lower portion of the back of the back plate 10 and, at its upper end 44, extends into the louvre 26. The mounting portions have holes 46 which will register with the holes 22 in the back plate when the offset is snugly seated against the bottom edge 48 of the back plate. Bolts 50 will then be extended through the usual holes in the bottom of the license plate, the holes 22 in the back plate and the holes 46 in the mounting portions of the sticker tabs to anchor the license plate firmly and lock the mounting tabs to the back plate. The mounting tabs are thus secured to the back plate with a high degree of firmness and rigidity by virtue of their bolted connection, the bearing of the offsets 38 against the bottom edge 48 of the mounting plate, and the containment of the upper ends 44 of the mounting portions in the louvres 26.

It will be appreciated that the plateholder described here may readily be mounted in inverted fashion as well as in the fashion shown so that the sticker tabs may extend upwardly from the plateholder proper rather than downwardly. The bolts 42 may, as well, be used to mount the plateholder to the cycle, physical accommodation permitting. It will also be appreciated that the sticker tabs may occupy positions other than those illustrated such as extending out laterally instead of vertically nor need they be necessarily arranged in contemplation of the existing holes in license plates. Flat headed screws may be used under the license plates to effect the attachment of the tabs should other locations be desired. It will be further noted that the sticker tabs may readily be removed if not needed, with no impairment to the appearance of the holder. It will also be understood that the bolt holes 20, 33, 22 and 46 may be transverse slots if matching to different bracket spacings or license perforations requires. The engagement of the bevels of the closure plate will maintain its orientation, and the offset and louvre containment of the sticker tabs will maintain theirs.

It will be further appreciated that there has been described here an embodiment only of this invention, and that other alternatives as to the details set forth will readily suggest themselves to those skilled in the art.

I claim:

1. A license plateholder comprising a back plate slightly larger than a license plate and having three bevel-ended edges recurved over one side of said plate to define three sides of a license-plate-edge-confining frame, and a closure plate comprising a back flap overlapping the other side of said back plate and having a bevel-ended recurved edge constituting the fourth side of said frame, said back plate and back flap being perforated in alignment for reception of bolts to secure said back plate and back flap together with the ends of said fourth frame side abutting the free ends of said three sides and to secure a license plate to said holder and said holder to the license plate mounting brackets of a vehicle.

2. The combination as set forth in claim 1 wherein said back plate includes a louvre-type pocket offset therefrom on the said other side of the back plate.

References Cited

UNITED STATES PATENTS

| | | | |
|---|---|---|---|
| 1,498,889 | 6/1924 | Snell | 40—210 |
| 1,792,445 | 2/1931 | Price | 40—210 |
| 1,852,375 | 4/1932 | Read | 40—210 |

EUGENE R. CAPOZIO, *Primary Examiner.*

W. J. CONTRERAS, *Assistant Examiner.*